(12) United States Patent  
Tyroler

(10) Patent No.: US 7,086,162 B2  
(45) Date of Patent: Aug. 8, 2006

(54) METHOD AND APPARATUS FOR DISTANCE MEASUREMENT

(76) Inventor: Dan Tyroler, 37 Baker Hill Rd., Great Neck, NY (US) 11023

(*) Notice: Subject to any disclaimer, the term of this patent is extended or adjusted under 35 U.S.C. 154(b) by 0 days.

(21) Appl. No.: 11/021,776

(22) Filed: Dec. 23, 2004

(65) Prior Publication Data

US 2006/0137194 A1    Jun. 29, 2006

(51) Int. Cl.
*G01B 11/14* (2006.01)
(52) U.S. Cl. .......................... 33/277; 33/1 G
(58) Field of Classification Search ............. 33/277, 33/1 G, 1 CC, 276, 278, 279, 280, 465, 471
See application file for complete search history.

(56) References Cited

U.S. PATENT DOCUMENTS 5,493,786 A * 2/1996 Thomson ............... 33/1 G
6,199,292 B1 * 3/2001 Ebeling ................. 33/775
6,560,560 B1 * 5/2003 Tachner ................. 702/164
6,694,629 B1 * 2/2004 Goodrich ............... 33/286
6,763,598 B1 * 7/2004 Chen .................... 33/286

OTHER PUBLICATIONS

Product Description: Calculated Industries 3336 Laser Dimension Master, by Calculated Industries, Amazon.com, Web site:htt//www.amazon.com.
Product Description: Bosch DWM40L Digital Protractor/Angle Finder, Web site: http://store.yahoo.com/boschpowertoolsource.

* cited by examiner

*Primary Examiner*—Christopher W. Fulton
(74) *Attorney, Agent, or Firm*—Gottlieb, Rackman & Reisman, P.C.

(57) ABSTRACT

A device for measuring physical characteristics includes a beam generator component generating first and second beams at two points. The device further includes a protractor that measures the angle between the beams. The device measures the distances to the two points and with the angle between the two beams, determines a predetermined characteristic, such as the distance between the two points.

22 Claims, 5 Drawing Sheets

METHOD AND APPARATUS FOR DISTANCE MEASUREMENT

BACKGROUND OF THE INVENTION a. Field of Invention

This application pertains to an automatic apparatus and method for measuring a distance between two points. More specifically, in one embodiment, the distance is between two points is obtained from a remote location by measuring the distances from the remote location to each of the points, measuring a corresponding angle, and using these parameters to determine the distance therebetween.

b. Description of the Prior Art

It is frequently important to measure the distance between two points. For example, surveyors have a large number of tools and devices and disposal to measure the distances between landmarks, as well as their elevation and relative bearing.

Contractors and other professionals in the building industry often need to measure distances between various critical points as well. Traditionally this was accomplished by extending or laying down a measuring tape between the two points and reading the distance from the tape. If the tape was too short, or if there are obstacles between the points, then intermediate measurements are made along the path between the two points. Of course, this process is tedious and time-consuming. Moreover, in some instances, one or both points of interest are inaccessible and therefore the distance between them can be determined using indirect means or approximations.

Recently, the task of measuring devices has been eased somewhat by the availability of electronic measurement devices. These devices are now readily available and work by sending out an ultrasound, laser or other types of beams and determining the transit time required for the beam to reach the selected point, and return. One such device, called the Laser Dimension Master is made by Calculated Industries of Carson City, Nev. The device has a head rotatable between two perpendicular positions and generates an ultrasound beam for making measurements and a visible laser beam for aiming the device. While these devices are easy to use, most of them can still only measure the distance from the measuring device and a remote point and cannot be used from a remote location to measure the distance between two arbitrary points. One exception presently known are the laser measuring device made by Lasermeters of Edmond, Okla. (See Lasermeters.com). This company makes a line of devices under the name of Disto. A Disto device can be used to measure the distance between two points using three measurements. First, the device is directed at the first point and a measurement is taken. Next, the device is directed at an intermediate point disposed along a perpendicular line to the line between the two points and a second measurement is taken Finally, the device is directed at the second point and a third measurement is taken. The distances between the first point, the intermediate point, and the second point are determined using the Pythagorean Theorem, and then added. This approach has many problems which render it impractical for most applications. First, the user must determine by eye the location of the intermediate point. Obviously this process introduces a degree of uncertainty and inaccuracy. Second, in most instances, except in very special instances, the intermediate point does not even fall between the two points, in which case, the distances must be subtracted, not added.

In addition, devices of various complexities are known for measuring angles. Initially, these devices, including protractors, and the like, were strictly mechanical devices. In more recent times, electronic angle measuring devices have become available which can make the task of measuring angles easier and more accurate. One device is available from Bosch (Model No. DWM40L) However, these devices cannot be used to measure distance.

SUMMARY OF THE INVENTION

Briefly, a device for measuring the distance between two arbitrary points according to this invention includes means for determining two reference distances between a reference point and the two arbitrary points; means for determining a corresponding angle; and means for calculating the distance between the points from said reference distances and said corresponding angle. The means for determining the two reference distance can be implemented as from a device using a single beam that is selectively directed at the two points, or as a device generating two separate beams. The beams can be ultrasonic or laser beams. If an ultrasonic beam is used, a separate aiming beam is also generated that is visible so that the user can see when the arbitrary points are targeted correctly.

In one embodiment, a device is provided with a beam generator that is selectively aimed at different points. In another embodiment, the beam generator generates a beam that is then deflected by a rotatable mirror. The mirror is selectively pivoted, deflected or its direction is changed by other similar means to direct the beam at the two arbitrary points, and the angle of the beams is then determined from the position of the mirror. In another embodiment, the mirror is reciprocated back and forth to paint a line on the target. The device is then manipulated to position the line with its ends corresponding to the arbitrary points. Mems technology could be used to achieve the above-mentioned mirror effect.

In one embodiment, the device includes a joy-stick type controller that can be pivoted to direct the beam(s) and then activated to cause the device to calculate the distance from the beam to the arbitrary points.

In addition to the distance between two points, other measurements may be made and calculated using the device. Some of these measurements (for example) may require determining the distance to more than two points.

In another embodiment, the device is incorporated or imbedded into a system, such as a robot or automobile, and used as to measure distances and other parameters automatically.

DETAILED DESCRIPTION OF THE PREFERRED EMBODIMENT

Figure 1:
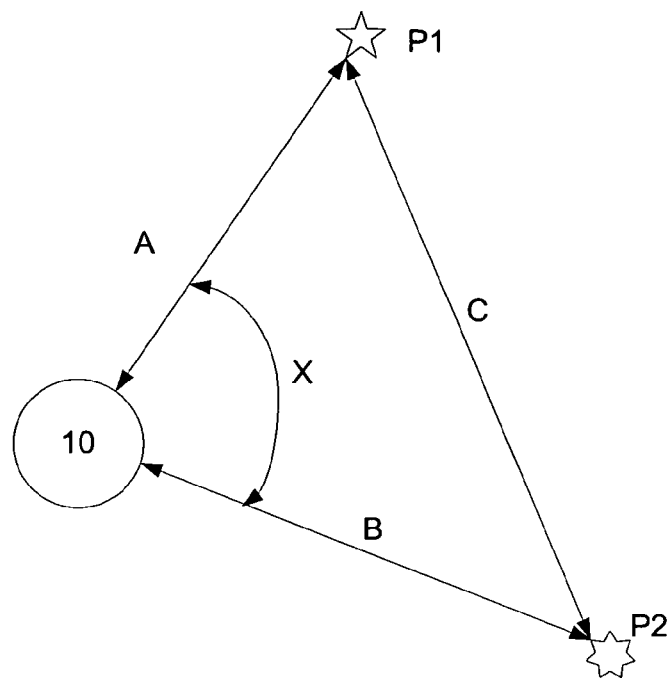
FIG. 1 shows a somewhat diagrammatic view of a device constructed in accordance with this invention and used to measure the distance between two arbitrary points.

Referring now to FIG. 1, a device 10 constructed in accordance with this invention is used to determine the distance C between two points P1 and P2. As shown in FIG. 1, the two points can be two different objects, or they can be points disposed on the same object. The distance is determined by generating a first beam and targeting it at point P1, generating a second beam at a known angle X with respect to the first beam and targeting it at point P2. The device 10 uses these beams to measure the distance A to point P1 and distance B to point P2. These distances can be determined by using any of the technique well known in the art. Moreover, as discussed in more detail below, the two beams can be generated by the same, or by two different components, and can be generated simultaneously, or sequentially. The device 10 also measures the angle X between the two beams.

Once these parameters are known, the distance C can be calculated using well known principles. For example, the distance C can be calculated using the formula:

$$C^2 = A^2 + B^2 - 2AB \cos X.$$

This formula is generally known as the law of cosines.

Figure 2:
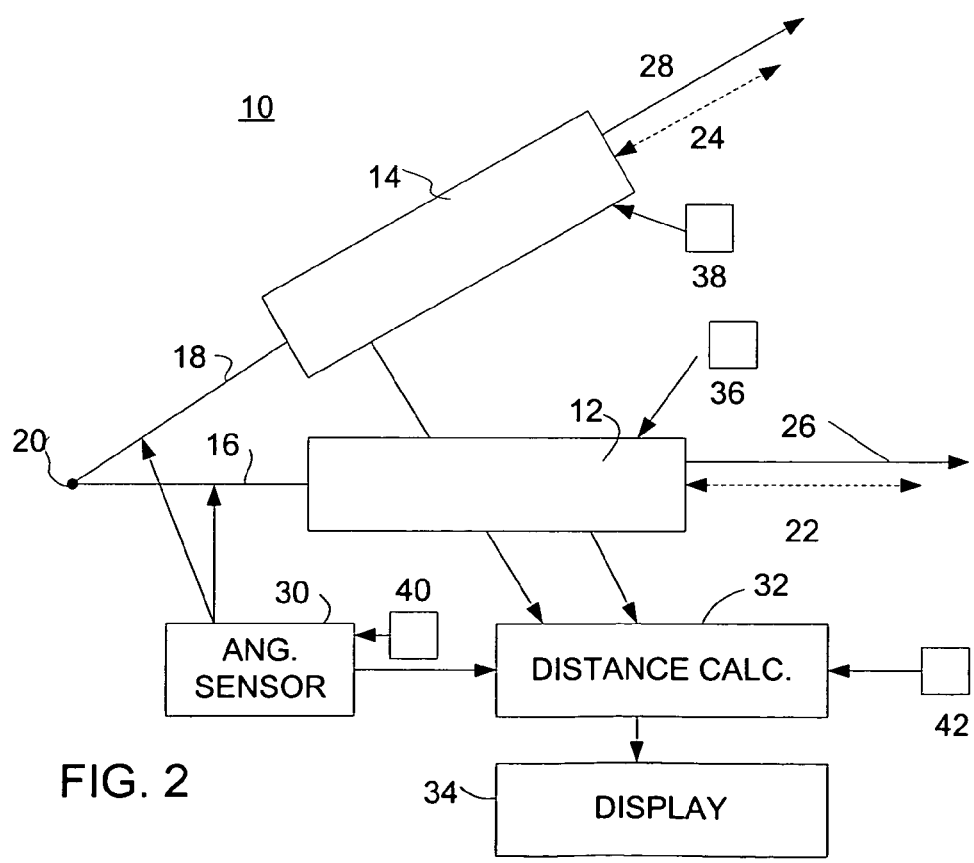
FIG. 2 shows a somewhat diagrammatic block diagram of a device constructed in accordance with this invention.

FIG. 2 shows details of a first embodiment of the invention. In this Figure, device 10 includes a distance calculator 12 and a second distance calculator 14. The two distance calculators are secured to respective arms 16, 18. The two arms are mounted so that they are pivotable with respect to each other around a point 20. For example, the two arms could be mounted on a frame (not shown) with one arm being fixed and the other arm being pivotable. Alternatively, both arms could be mounted to the frame so that they pivot around point 20.

Distance calculator 12 generates a primary beam 22 used for determining the distance to a remote point (such as P2 in FIG. 1). As discussed above, many devices are known which utilize an ultrasonic beam, or a laser beam or other similar beams. The distance calculator 12 also includes means for determining the distance between the device and the point being targeted. For example, this distance could be determined by measuring the time that the beam 22 takes to reach the targeted point and then return. For this purpose, the calculator 12 includes a sensor to detect the return beam. Other means of determining the distance may be used as well. Moreover, while the calculator 12 generates the beam 22, and senses the beam reflected from the targeted point, the actual data manipulation for determining the distance can be performed remotely and need not be supported on the arm 16.

In the embodiment of FIG. 2, distance calculator 14 can have the same structure as the calculator 12, or may have a different structure. The Distance calculator 14 is used to determine the distance to another point, such as point P1.

As discussed above, in many instances, the beams generated by calculators 12, 14 may not be visible and therefore, the user may find it difficult to target the respective points P1, P2 accurately. In order to facilitate the targeting of the points, the calculators may generate a secondary or aiming beam 26, 28. These beams may be either laser beams could be composed of a laser beam of particular color, or a beam of highly concentrated light, generating an image on the respective targeted point. Preferably beams 26, 28 are either parallel with the respective beams 22, 24 and disposed close to these beams, or they could be coincident with these beams. Thus, beams 26, 28 assist in the aiming of the distance calculators on the respective targeted points.

The device 10 also includes an angular sensor 30. The angular sensor 30 is used to determine the relative angle X between the arms 16, 18 and, therefore, beams 22, 24. In its simplest form, the angular sensor 30 may be a standard protractor. The user can then read the angle X and enter it manually. However, preferably, the angular sensor is a digital protractor or other similar means that can measure the angle X between the arms automatically and generate a corresponding digital signal. As discussed above, digital devices of this type are well known in the art.

Further included in the device 10 is a third distance calculator 32. this distance calculator receives the distances A and B from calculators 12 and 14 and the angle X from angle sensor 30. Once these parameters are received, the calculator 32 determines distance C using, for example, the formula given above, and shows this distance on display 34.

The device 10 is operated as follows. Each of the calculators is associated with a respective actuator or triggering device 36, 38, 40, 42. A user first triggers the actuator 36. This action causes the beam 22 (and beam 26, if necessary) to be generated. The user then positions the calculator 12 with the beam 22 impinging on the first point. The user then releases the actuator 36, thereby indicating that the first point has been targeted. The calculator 12 then determines the distance A and feeds it to calculator 32. The user then triggers the actuator 38 and targets calculator 14 on the second point. When the actuator 38 is released, the distance B is calculated and fed to calculator 32. The user then triggers actuator 40 causing the angular sensor 30 to be activated. When this actuator 40 is released, the sensor 30 determines angle X and feeds it to the calculator 32. Finally, the user can trigger actuator 42 causing calculator 32 to act the information received and calculate the distance C and show it on display 34. Of course, other sequences may be employed to operate the device 10. For example, a first trigger may be used to turn on both beams 22 and 24. The user can then target each of the points with one of the beams. With the beams pointed at the respective points, the user can trigger a second actuator means to cause the calculators 12, 14 and sensor 30 to determine their respective information and to feed the same information to the distance calculator. A third actuator can then be used to trigger calculator 32. Alternatively, the calculator 32 can be configured to sense when it receives information from components 12, 14, 30, and to generate distance C after all the information has been received.

As previously mentioned, the calculations for determining A and B need not be performed by calculators 12, 14, but can be done remotely. For example, these calculations may be done by calculator 32 after the latter receives inputs from the calculators 12, 14 with some information from which A and B can be derived.

Figure 3:
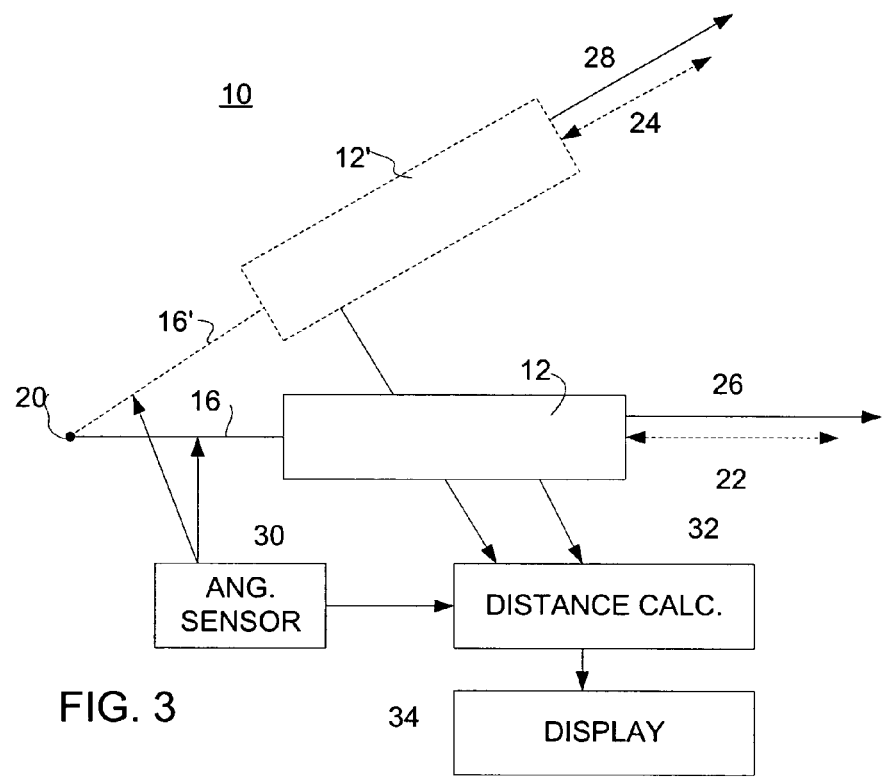
FIG. 3 shows a second embodiment of the invention.

FIG. 3 shows another embodiment of the invention. In this embodiment, the calculator 12 and its arm 16 are movable to the positions 12' and 16', respectively, as shown. In this embodiment, a single beam source can be used to target and measure the distance to both points P1, P2. Alternatively, instead of moving the beam source, a mirror arrangement may be used as well to generate a sweeping beam that could be directed sequentially at the two points P1, P2.

Figure 4:
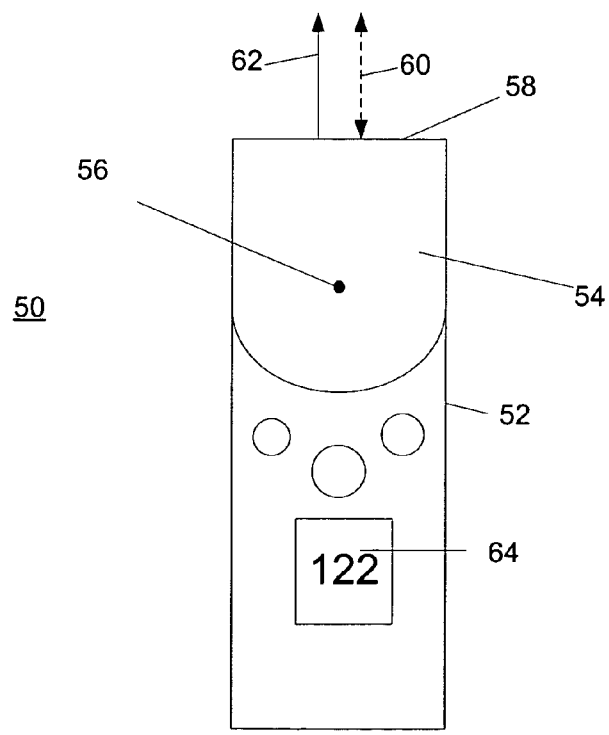
FIG. 4 shows a third alternate embodiment of the invention.

FIG. 4 shows another alternative. In this figure, device 50 includes a housing 52 with a head 54 that rotates or pivots about an axis 56. The rotation or angular position of the head 54 is monitored by an angle sensor, such as 30. The head 54 has a face 58 through which beam 60 is emitted from an internal beam source (not shown). Optionally, an aiming beam 62 is also generated. The device 50 can be operated easily by holding its housing 52 with one hand while directing the head 54 with the other hand or finger until it is targeting the desired points P1, P2. A display 64 is provided on the housing to show the various distances and parameters, including A, B, C and X. Buttons 66 may be provided on the housing for turning the device 50 on and off and for actuating or initializing the various measurements, as discussed above.

Figure 5A:
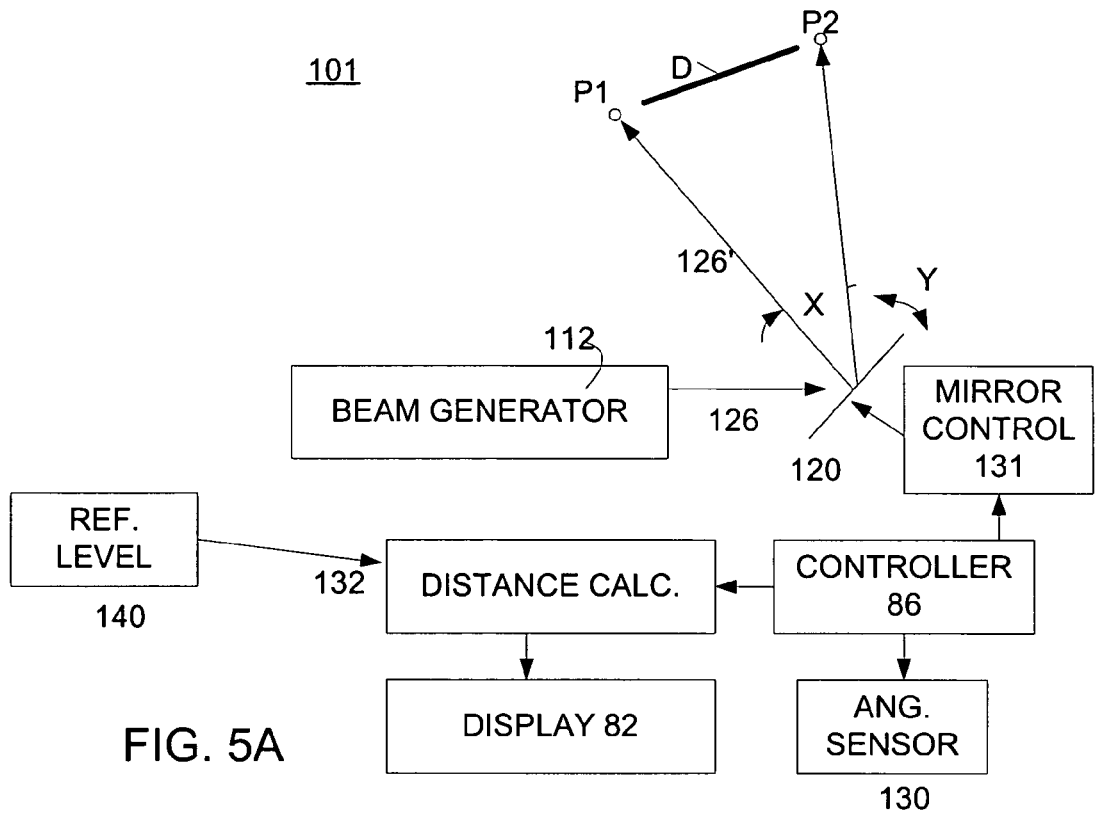
FIG. 5A shows a fifth embodiment of the invention.
Figure 5B:
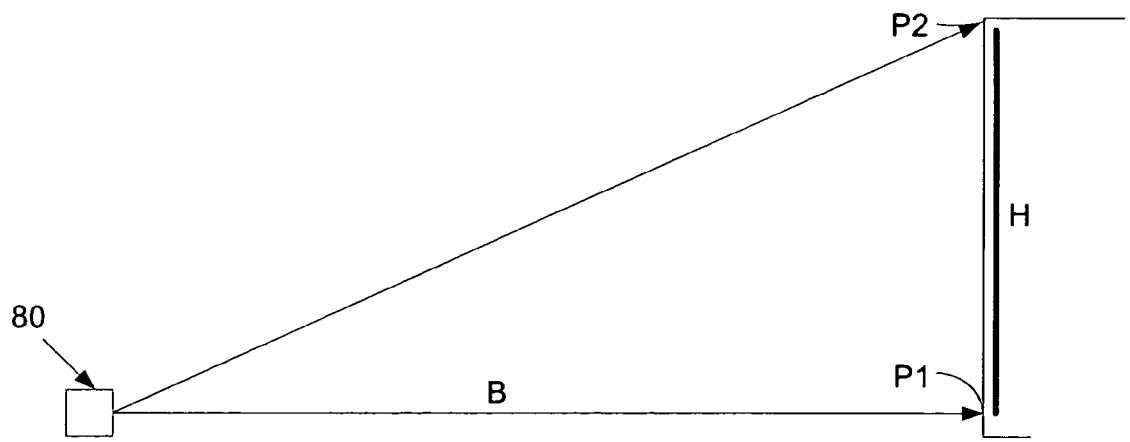
FIG. 5B shows how a device may be used to determine a height.
Figure 5:
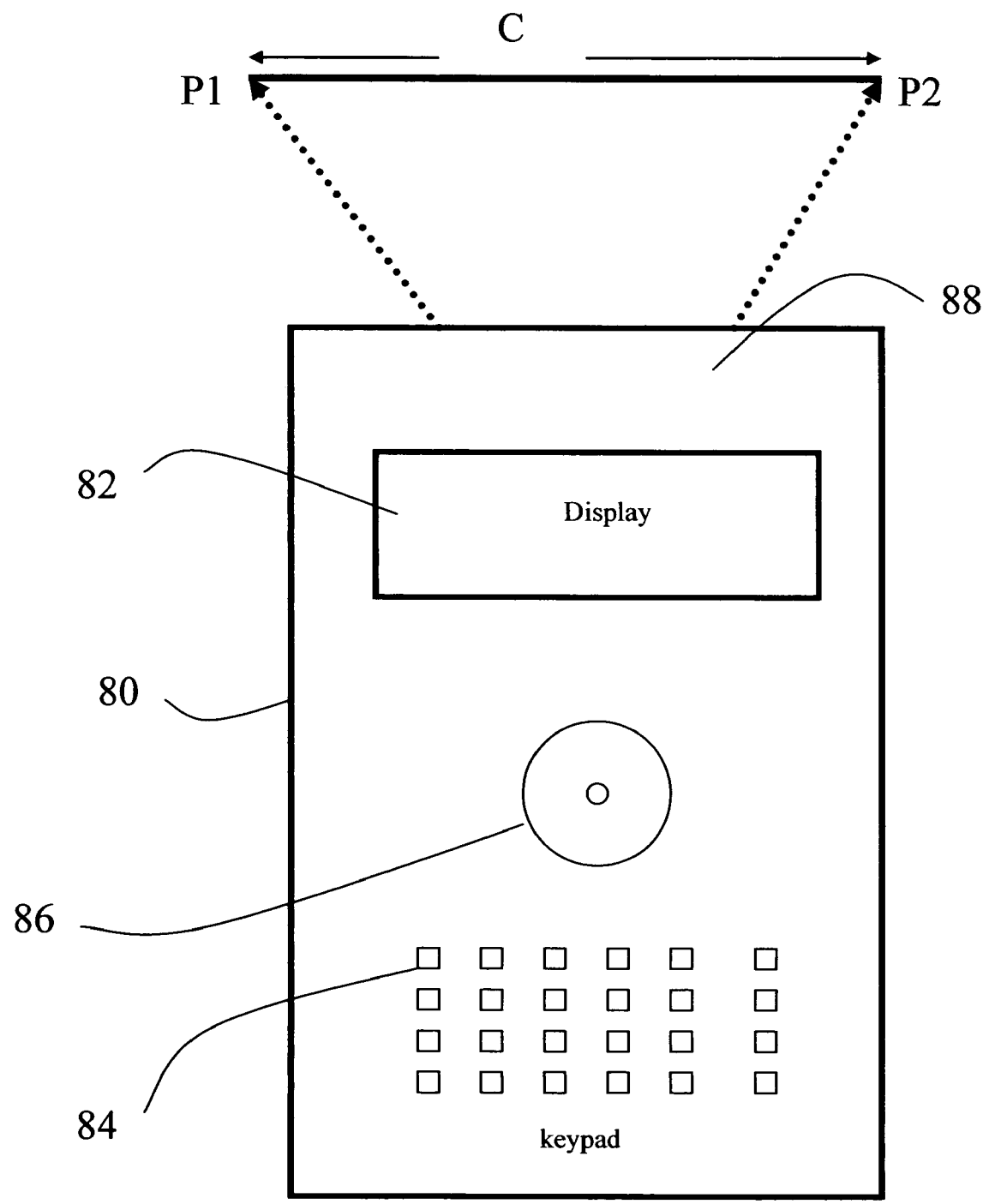
FIG. 5 shows a fourth embodiment of the invention.

FIG. 5 shows yet another embodiment of the invention. This embodiment consists of a housing 80 having the shape of a calculator with display 82 and a set of keys 84. The device further includes a controller 86. The controller 86 allows a user to generate both rotation and activation commands. For example, the controller 86 could be a joy stick that can be operated with one finger to cause the measuring/aiming beam(s) to be shifted angularly. The controller can also be pushed inwardly to indicate that the beam(s) are pointing at one of the desired points and a measurement is to be taken. The housing 80 also contains a beam generator and an associated sensor that can be used together to measure distances.

In one embodiment of the invention, the device is used as follows. First, the device is directed so that its front 88 in the general direction of point P1. Then the beam generated by the device is aimed at point P1 by pivoting the controller 86 with one finger, while holding the housing 80 steady. Once point P1 is targeted, the controller 86 is pushed causing the device to determine distance A. Next, while the housing is held steady, the controller 86 is pivoted to cause the beam to be directed at point P2. Once point P2 is targeted, the controller 86 is pushed again and the distance B is determined, together with angle X The distances A and B and the respective angle X are used to determine the distance C between the two points, as discussed above. The distance C is shown on display 82.

As discussed above, in one embodiment, the controller 86 causes a beam generator to turn and direct a beam in a variable direction determined by the controller 86. In another embodiment, shown in FIG. 5A, the circuitry for the device of FIG. 5 is implemented as follows. The circuitry 101 includes a beam generator 112 that generates a beam 126, a distance calculator 132, a mirror 120, a mirror control circuit 131 and an angle sensor 130. Mirror 120 may be made and implemented using MEMs (microelectromechanical system) technology. The controller 86 is disposed on the device 80 and can be pivoted, as described above in conjunction with FIG. 5. This pivoting is transmitted as a rotation by mirror control circuit 131 to mirror 120. Therefore, the pivoting of the controller 86 causes the mirror to rotate. The beam generator 112 is arranged to direct its beam at mirror 120. The mirror 120 then redirects the beam at an angle that is determined by the controller 86. The user first operates the controller 86 to direct the beam at point P1. The user then pushes the controller 86 causing it to generate a signal to distance calculator 132. The distance calculator then obtains information from the beam generator 112 (which also receives information regarding signals returned from point P1) and determines the distance A. Next, the user pivots the controller 86 causing the beam to be directed at point P2. The user then pushes the controller 86 and the controller sends a second signal to the distance calculator 132. The distance calculator 132 then determines distance B. The second pushing on the controller 86 also causes the angular sensor 130 to sense the angle by which the mirror 120 has been rotated. This measurement can be determined by either measuring the angle of rotation of the mirror 120, or from the mirror control circuit 131. Once these parameters are obtained, the distance calculator determines the distance C as described above.

In the embodiment just described, the mirror 120 is normally stationary, except when moved by the controller 86. In another embodiment of the invention, the mirror control circuit 131 causes the mirror to rotate constantly at high speed by an angle Y, causing the beam 126 to paint or render a straight line D on a target surface. In this embodiment, pivoting the controller 86 determines this angle Y, and therefore, the length of line D. In this embodiment, the user aims the device 80 so that the line D appears somewhere between points P1 and P2. He then pivots the controller 86 causing the line D to lengthen or shorten as desired, until its ends reach points P1 and P2. Then the user pushes the controller 86. This action indicates to the distance calculator that the ends of line D coincide with points P1 and P2 and therefore the parameters A, B and X can be determined and the distance C can be calculated.

The devices discussed in FIGS. 1–5A can be used to determine not only the distance between two points but other parameters as well. For example, as shown in FIG. 5B a device 150 can be used to measure the height H of a building by measuring the distance along a vertical line between points P1 and P2, with point P2 being at the top of the building. For this measurement to be accurate, the line between the two points P1, P2 should be as close to the true vertical as possible. Therefore, for this type of measurements, the device 80 includes a reference level indicator 140. This reference level indicator may be, for example, a plumb line or a spirit level. Alternatively, the reference level indicator could be an electronic device. In either case, the device 140 is used to indicate or confirm that the line D drawn by the device 80 is either vertical or horizontal.

Figure 6:
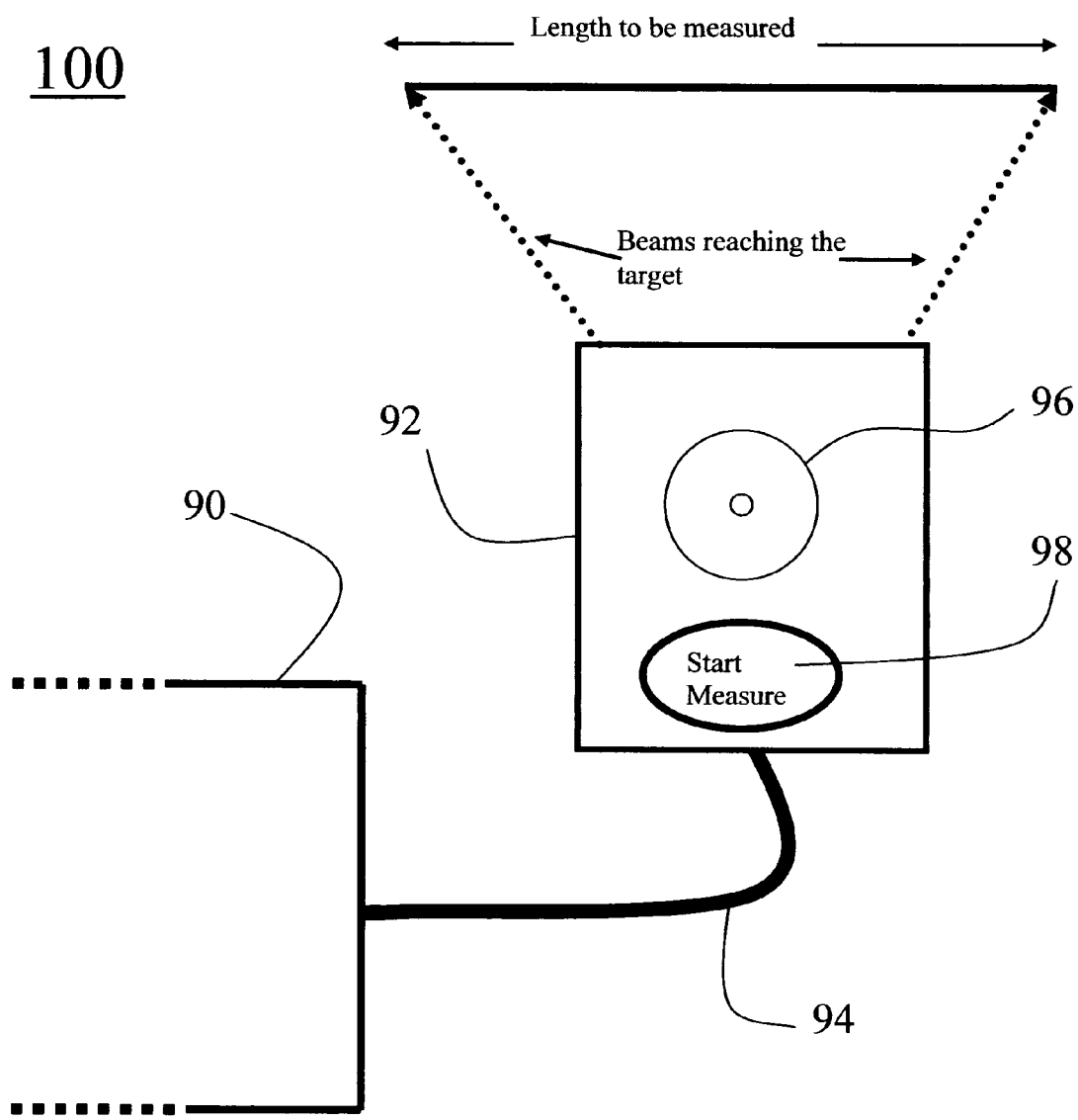
FIG. 6 shows a fifth embodiment of the invention.

FIG. 6 shows an embodiment in which a distance measurement device constructed in accordance with this invention is incorporated or imbedded into an electronic apparatus, such as a PDA, a lap-top, etc. In this embodiment, an apparatus 100 has two components: a component 90 used to make the calculations and/or store data, and a second component 92 used for making measurements. The two components are connected by a wired or wireless connection 94.

The component 92 includes one or more beam generators. A controller 96 is used to direct the beams or, alternatively, to draw a line on a target as described above. One or more actuators 98 (that may be part of the controller 96) are used to initiate the beams and to make the measurements. The signals sensed by sensors (not shown) within the component 92, including the angle between the beams are transmitted via the connection 94 to the host 90. The host 90 then makes the necessary calculations and stores or displays the resulting data.

While the device has been described primarily for measuring the distance between two arbitrary points, it can be used for various other functions, including determining angles, areas, volumes, curvatures, and so on. Each of these measurements can be accomplished by measuring distances to two or more points and the corresponding relative angles and then performing some basic geometric calculations. Some of the calculations may require measurements to more than two points. The invention may be used to determine lengths, height, depth, area, volume, etc. The invention may be used in the construction trade, carpentry, ship building, architectural design, landscaping, gardening, housing and building inspection, tunnel construction, mining, large manufacturing processes, medical applications. The invention may also be incorporated or imbedded in various large and small devices, such as laptops, PDAs, cell phones, robots, motor vehicles (where the invention may be used to assist a driver in parking or park a motor vehicle automatically), medical and surgical equipment etc.

Numerous modifications may be made to the claims without departing from its scope as defined in the appended claims.

I claim:

1. A device for measuring the distance between two arbitrary points comprising:
    means for determining two reference distances between a reference point and the two arbitrary points, said means for determining including a first beam generator generating an invisible beam selectively directed from said reference point to one of said arbitrary points and a second beam generator generating a visible beam corresponding to said invisible beam to enable a user to target said invisible beam;
    means for determining a corresponding angle; and
    means for calculating the distance between the points from said reference distances and said corresponding angle.

2. The device of claim 1 wherein said means for determining two distances includes a first source generating said first invisible beam for targeting one of the arbitrary points and a second source generating a second beam for targeting the other of the arbitrary points.

3. The device of claim 1 further comprising a pivoting member for pivoting said beams to said arbitrary points.

4. The device of claim 1 wherein said invisible beam is one of a laser and an ultrasonic beam.

5. The device of claim 1 wherein said visible and invisible beams are coincident.

6. The device of claim 1 wherein said visible and non-visible beans are parallel to each other.

7. A measuring device comprising:
    a beam generator that generates a beam;
    a pivoting mirror selectively directing said beam at a first and a second arbitrary point;
    an angle sensor that provides the angle between the first and a second arbitrary point; and
    a calculator using at least a distance associated with said beam and said angle to determine a physical characteristic associated with said arbitrary points.

8. The device of claim 7 further comprising a pivoting member to pivot said beam by said angle.

9. The device of claim 7 further comprising a rotating member that selectively rotates said mirror.

10. The device of claim 9 wherein said mirror is moved back and forth between two positions to generate an apparent line on a target.

11. The device of claim 7 further comprising a housing holding said beam generator and said calculator, said housing being sized and shaped to be hand-held by a user.

12. The device of claim 7 further comprising a first component holding said beam generator and a second component holding said calculator.

13. The device of claim 12 further comprising a connection between said first and second components.

14. The device of claim 12 wherein said connection is a wired connection.

15. The device of claim 12 wherein said connection is a wireless connection.

16. The device of claim 7 wherein said beam generator generates a laser beam.

17. The device of claim 7 wherein said device is imbedded into an apparatus.

18. The device of claim 7 further comprising a distance detector that detects a first distance to said first point and a second distance to the second point using said beam, and wherein said calculator further determines a third distance between said points based on said first distance, second distance and said angle.

19. A device for measuring the distance between a first point and a second point comprising:
    an image generator disposed at a reference point generating an image of a line having a first end and a second end, said line having a variable length;
    a distance detector that determines a first distance between the reference point and the first end, and a second distance between the reference point and the second end;
    an angle detector that determines an angle between said ends as defined from said reference point; and
    a calculator that calculates the distance between said first and second ends from said first distance, said second distance and said angle.

20. The device of claim 19 wherein said device includes a controller used to select the length of said line.

21. The device of claim 19 further comprising a housing containing the elements of said device.

22. The device of claim 19 further comprising a display showing the distance between said ends.

* * * * *